(12) United States Patent
Vinson et al.

(10) Patent No.: US 9,584,858 B2
(45) Date of Patent: Feb. 28, 2017

(54) EMPIRICAL AD POD DETECTION

(71) Applicant: Rentrak Corporation, Portland, OR (US)

(72) Inventors: Michael Vinson, Piedmont, CA (US); Maria Loper, Portland, OR (US); Amir Yazdani, Portland, OR (US); Bruce Goerlich, Forest Hills, NY (US)

(73) Assignee: RENTRAK CORPORATION, Portland, OR (US)

( * ) Notice: Subject to any disclaimer, the term of this patent is extended or adjusted under 35 U.S.C. 154(b) by 336 days.

(21) Appl. No.: 13/827,842

(22) Filed: Mar. 14, 2013

(65) Prior Publication Data

US 2013/0247080 A1    Sep. 19, 2013

Related U.S. Application Data

(60) Provisional application No. 61/612,813, filed on Mar. 19, 2012.

(51) Int. Cl.
| | |
|---|---|
| *H04N 21/442* | (2011.01) |
| *H04N 21/422* | (2011.01) |
| *H04N 21/658* | (2011.01) |
| *H04N 21/81* | (2011.01) |

(52) U.S. Cl.
CPC . *H04N 21/44213* (2013.01); *H04N 21/42213* (2013.01); *H04N 21/442* (2013.01); *H04N 21/44222* (2013.01); *H04N 21/6582* (2013.01); *H04N 21/812* (2013.01)

(58) Field of Classification Search
CPC ....... H04N 21/42201; H04N 21/42203; H04N 21/4223; H04N 21/4394; H04N 21/44008; H04N 21/4402; H04N 21/23424; H04N 5/2723; H04N 21/812; H04N 21/258; H04N 21/2668; H04N 2005/544547; H04N 2005/44556; H04N 2005/44565; H04N 5/44543; H04N 21/4755; G06Q 30/0241;
(Continued)

(56) References Cited

U.S. PATENT DOCUMENTS

| | | |
|---|---|---|
| 4,264,925 A | 4/1981 | Freeman et al. |
| 4,355,372 A | 10/1982 | Johnson et al. |
| 4,603,232 A | 7/1986 | Kurland et al. |

(Continued)

OTHER PUBLICATIONS

International Search Report and Written Opinion for PCT/US2013/033012, Applicant: Rentrak Corporation, Date of Mailing: Jul. 25, 2013, 9 pages.

*Primary Examiner* — Ngoc Vu
(74) *Attorney, Agent, or Firm* — Baker & Hostetler LLP

(57) ABSTRACT

A system and method for analyzing the viewing behavior of end users that are viewing video content to determine the likely presence of one or more advertisements being viewed and to assess the viewers who stop viewing during the course of such advertisements. The system periodically or continuously receives tune data reflecting the viewing behavior of end users, analyzes the cumulative viewing behavior reflected by the received tune data, and delivers a report of the analysis to advertisers, agencies, media sellers, or other parties that are interested in measuring the effectiveness of advertisements on end users. The analysis by the system can be done over multiple different types of content-distribution platforms.

20 Claims, 5 Drawing Sheets

(58) Field of Classification Search
CPC ........... G06Q 30/0242; G06Q 30/0254; G06Q 30/0255
USPC ............ 725/9, 14, 16, 21; 705/14.41, 14.44, 705/14.46
See application file for complete search history.

(56) References Cited

U.S. PATENT DOCUMENTS

| | | |
|---|---|---|
| 5,023,929 A | 6/1991 | Call |
| 5,675,510 A | 10/1997 | Coffey et al. |
| 6,070,145 A | 5/2000 | Pinsley et al. |
| 6,098,048 A | 8/2000 | Dashefsky et al. |
| 6,115,680 A | 9/2000 | Coffee et al. |
| 6,708,335 B1 * | 3/2004 | Ozer et al. ....................... 725/20 |
| 7,039,928 B2 | 5/2006 | Kamada et al. |
| 7,954,120 B2 | 5/2011 | Roberts et al. |
| 8,365,213 B1 * | 1/2013 | Orlowski ........................ 725/13 |
| 9,071,370 B2 * | 6/2015 | Toner ..................... H04H 60/43 725/14 |
| 2002/0059632 A1 | 5/2002 | Link et al. |
| 2002/0112239 A1 | 8/2002 | Goldman |
| 2003/0115585 A1 * | 6/2003 | Barsness et al. .................. 725/9 |
| 2006/0075421 A1 | 4/2006 | Roberts et al. |
| 2007/0199013 A1 | 8/2007 | Samari et al. |
| 2008/0148309 A1 | 6/2008 | Wilcox et al. |
| 2009/0100456 A1 | 4/2009 | Hughes |
| 2009/0234649 A1 | 9/2009 | Goodhew |
| 2009/0313232 A1 | 12/2009 | Tinsley et al. |
| 2010/0027836 A1 | 2/2010 | Sakurada |
| 2010/0318406 A1 | 12/2010 | Zazza et al. |
| 2010/0319018 A1 | 12/2010 | Zazza |
| 2010/0319019 A1 | 12/2010 | Zazza |
| 2011/0029374 A1 * | 2/2011 | Kodialam et al. ......... 705/14.42 |
| 2012/0078682 A1 | 3/2012 | Pinsley et al. |
| 2012/0191529 A1 * | 7/2012 | Lewis ................ G06Q 30/0242 705/14.41 |
| 2012/0260280 A1 | 10/2012 | Harsh et al. |
| 2012/0278828 A1 | 11/2012 | Yazdani et al. |

* cited by examiner

EMPIRICAL AD POD DETECTION

CROSS-REFERENCE TO RELATED APPLICATION(S)

This application claims the benefit of U.S. Provisional Patent Application No. 61/612,813, entitled "EMPIRICAL AD POD DETECTION," filed Mar. 19, 2012, which is incorporated herein by reference in its entirety.

BACKGROUND

The shift to digital broadcasting has improved the ability of content providers to determine the viewing behavior of their subscribers and other end users. Data received through digital converters, or set top boxes (STBs), can be collected and compared with a programmed schedule of broadcast content in order to estimate which programs are being viewed. The resulting viewing data can be communicated to a content provider, advertisers, and other interested parties to indicate when a particular group of subscribers has tuned to a particular piece of content.

With the advent of new distribution channels and flexible programming via which content providers are able to present content, however, it has become increasingly difficult using traditional techniques to determine the number of viewers viewing particular content and the impact of advertisements shown during that particular content. Although digital viewing data can be analyzed against regularly scheduled programming in which both program and advertisement times are scheduled, such traditional techniques fail for other types of programming. For example, local television stations will sometimes deviate from a programmed schedule of broadcasts, thereby making it difficult to assess which content is being viewed at which time. As another example, live programming will often have unpredictable schedules, such as sporting events which vary in length or important news events which pre-empt regularly-scheduled programming. Live programming therefore often results in inconsistent commercial breaks, length of programming, and start times for subsequent programming presented by a content provider. As yet another example, the use of digital video recorders (DVRs) allows viewers to watch recorded and/or streamed content on their own schedule. Accordingly, there is a need to improve the ability to assess a number of content viewers, particularly for content presented by content providers in a non-scheduled fashion.

DETAILED DESCRIPTION

Figure 1:
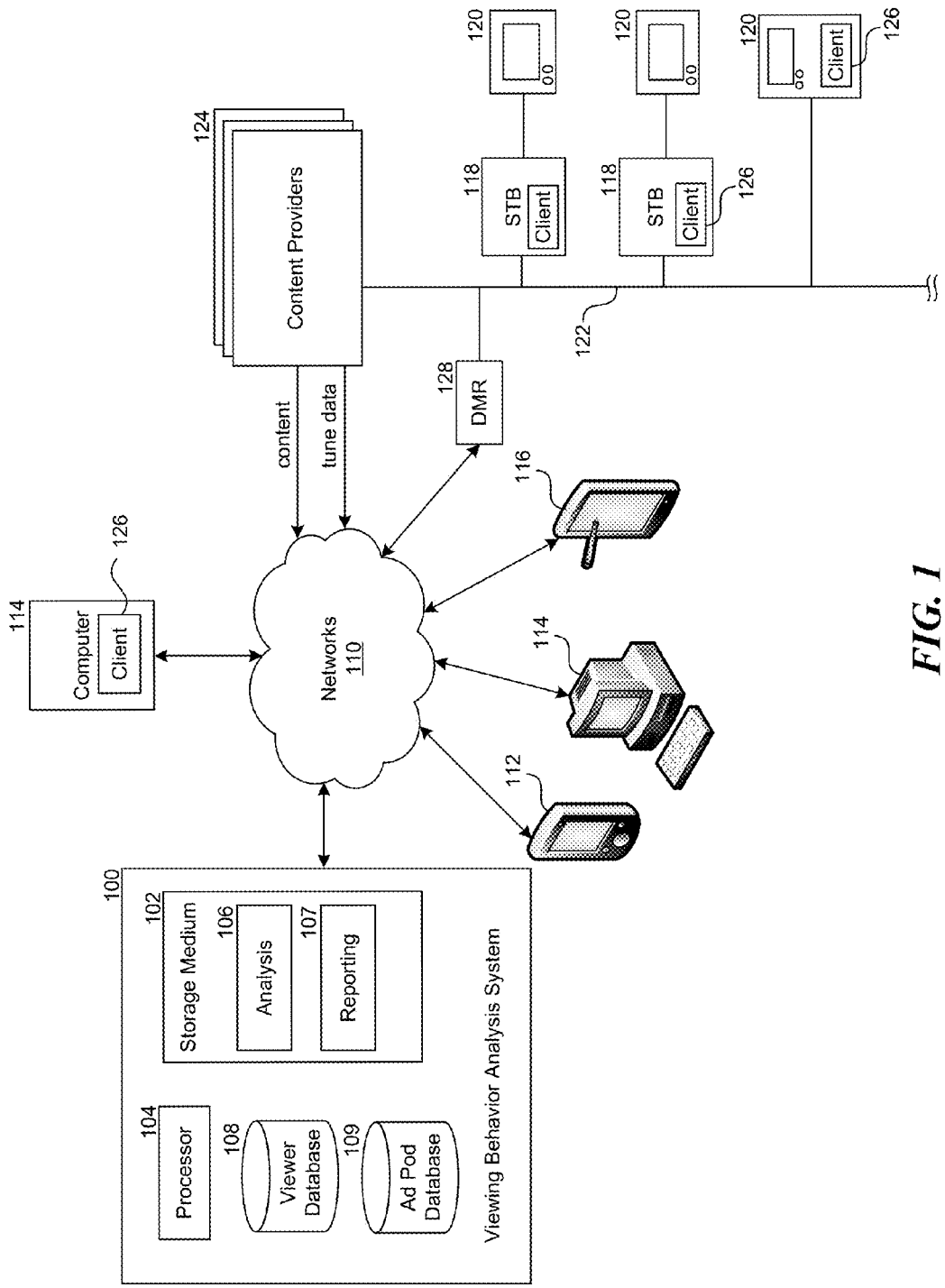
FIG. 1 illustrates an environment in which a viewing behavior analysis system operates for detecting sets of advertisements ("ad pods") in presented content.

A system and method for analyzing the viewing behavior of end users that are viewing video content to determine the likely presence of one or more advertisements being viewed ("ad pods") and to assess the viewers who stop viewing the content during the course of such advertisements is disclosed. The system periodically or continuously receives tune data reflecting the viewing behavior of end users, analyzes the cumulative viewing behavior reflected by the received tune data, and delivers a report of the analysis to advertisers, agencies, media sellers, or other parties that are interested in measuring the effectiveness of advertisements on end users.

The system receives data reflecting the viewing behavior of end users from a client incorporated in or coupled to an end user's video playback device, such as a set-top box (STB), digital video recorder (DVR), satellite TV receiver, internet protocol television (IPTV), computer, smartphone, or other viewer measurement devices and/or equipment that enable an end user to view content over a network. The clients monitor and capture events reflecting the viewing of content by end users, for example by recording channel-change events or other indications of viewing behavior. The system analyzes the data reflecting the viewing behaviors tracked by clients in order to determine when users are watching a particular channel or content, or when users have likely stopped watching a particular channel or content. The system aggregates the viewing behavior across multiple clients to determine the total number of end users likely watching particular content, such as content presented on a particular channel at a particular day and time. The analysis is based on one or more tune events occurring during a selected time period for which the data is being analyzed.

The aggregation by the system can be done over multiple content-distribution platforms, each capable of supporting clients. The viewing behavior can be analyzed over a period of time or during real-time, such as at the same time that particular content is being presented by a content provider. The content can include, for example, content broadcast on a particular channel on a particular day and at a specified time, streamed through a content provider's network, or re-played through a STB device.

The aggregate viewing behavior data (or "tune data") is analyzed by the system to generate a report of when significant drops in viewership occurred, indicating the likely presence of an ad pod. The report can highlight those ads and content where the drops occurred more or less frequently. The report is made available to advertisers, agencies, media sellers, or other parties that are interested in measuring the effectiveness of advertisements on end users.

Various embodiments of the invention will now be described. The following description provides specific details for a thorough understanding and an enabling description of these embodiments. One skilled in the art will understand, however, that the invention may be practiced without many of these details or with variations which are not specified here but which follow from the description in a way that will be clear to one skilled in the art. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 and the following discussion provide a general description of a suitable computing environment in which a viewing behavior analysis system ("system") 100 is implemented. The system 100 is configured to receive tune data from one or more content providers 124. In the representative environment, the depicted content provider 124 is a cable television operator that transmits program signals on a cable 122 (e.g., coaxial, optical). Content providers also include, but are not limited to, satellite television operators, local or regional broadcasters, and distributors of content over other transmission media such as the Internet or other network. Subscribers and end users view the program signals on televisions, video monitors, or other audio/video playback devices 120 (each of which is referred to herein as a "video playback device"). Each of the video playback devices is associated with a corresponding internal tuner or external set top box (STB) 118 that serves as an interface between the video playback device and the cable 122 or other transmission means on which the television program or other audio-video content is received. In some embodiments, the set top boxes 118 comprise cable television converters or satellite dish receivers. However, the set top boxes could also be digital video recorders (DVR), gaming consoles, audience measurement meters, or other electronic components which either allow a user to tune to a desired audio/video stream, or provide the functionality of recording tune events for later analysis. Broadly stated, the phrase "set top box" is used herein to refer to any device, component, module, or routine that enables tune data to be collected from an associated video playback device. Set top boxes may be stand-alone devices or set top box functionality may be incorporated into video playback devices.

The content providers 124 may also directly transmit content to other video playback devices via network 110. For example, video playback devices may also include smartphones 112, computers 114, and tablets 116. Content may be directly streamed to the video playback devices from content provider 124, or indirectly via devices such as digital media receivers (DMRs) 128. As used herein, a "video playback device" therefore also encompasses computers, smartphones, laptops, tablets, or other computing devices capable of displaying content provided by a content provider.

The content provider 124 receives signals indicative of tuning and other events that occur on video playback devices. The tuning events can represent such things as channel changes, recording or replaying of content that was transmitted to a STB, and changes in playback of content, such as when a subscriber pauses, fast forwards, or rewinds a program or otherwise varies its normal playback. In addition, the tuning events may indicate when a subscriber requests information from an interactive television subscription service.

The tune data is collected for the content provider 124 by clients 126 that are incorporated in or are associated with set top boxes 118 or video playback devices. A "client" refers to a software or hardware module within a device that is capable of monitoring, collecting, storing, and communicating tune data from a video playback device. The tune data is communicated to a content provider and/or third party for further analysis. The type of client 126 depends on the particular video playback device in which it is incorporated. As one example, a client 126 may be integrated in a set top box 118. The STB may be coupled to a monitor or other display, for example a STB 118 coupled via a coaxial cable to an analog television, or a STB 118 coupled via an HDMI or other digital signal channel to a digital television or other digital video display equipment (e.g., a computer monitor, video projector, etc.). The STB may include a digital video recorder ("DVR") that is configured to record one or more live video broadcast streams and is capable of providing deferred viewing or "time shifting" of a particular live broadcast that occurred at a certain time. As another example, a client may be directly built into a device having a monitor or display, such as a television 120 or a computer 114. For example, a client may be software in a personal computer 114 with a television tuning card capable of receiving a television broadcast over the air or over a cable television network. In another example, a personal computer 114 may have a client and receive a television broadcast over the Internet, e.g., via Internet, web television, IPTV, or similar streaming mechanism. In yet another example, a client may be incorporated in a mobile device, such as a mobile smartphone 112, that receives television over a wireless network.

In some embodiments, a client 126 may be integrated into equipment (not shown) serving multiple end users, such as head-end equipment of a cable television system, or head-end equipment of an internet communication network, or a single master antenna television ("SMATV") head-end that receives and rebroadcasts satellite television signals throughout a property.

Each client 126 records tune data associated with the associated video playback device. The client tracks or monitors the viewing behavior of a viewer using a method that is appropriate to the device in which the client is incorporated. For example, a STB client may determine that one or more viewers are likely viewing a video broadcast if the STB has recently received a channel, volume, or other input from the viewer via the remote control. In another embodiment, a STB client can determine that a particular viewer associated with that STB is likely viewing a video broadcast if the STB is turned on. In yet another embodiment, a DVR client can determine that a viewer is likely watching a video broadcast if the viewer provides a command to play back video content from a previously recorded video broadcast. Events reflecting viewing behavior that are tracked by a client may include, but are not limited to: a command to power-up or power-down a corresponding monitor or display, a channel or content switching event, such as channel changing events (e.g., "channel up", "channel down", "switch to channel 5", "switch to channel 13.2" (i.e., main channel 13, sub-channel 2), "access pay per view content channel 20", etc.) with or without the use of an electronic program guide, or commands controlling the playback of prerecorded content (e.g., "play", "stop", "fast forward", and "rewind" for content prerecorded on a DVR device, etc.). Each event is recorded by the client with an associated date/time stamp reflecting when the event occurred. To store tune data, for each event the client 126 may include a unique identifier associated with the set top box or video playback device, an identifier of the tune action (e.g., channel change, play, pause, etc.), an identifier that directly or indirectly identifies content being viewed (e.g., a channel that was tuned, or a unique identifier associated with the tuned content), and a time and data stamp indicating when the tuning event occurred. It will be appreciated that a greater or lesser amount of tune data for each event may be captured by a client.

Tune data is transmitted from clients 126 to content providers 124 and/or third party aggregators of tune data. A content provider or third party-aggregator may then periodically or continuously provide the tune data to the viewing behavior analysis system 100. Alternatively, the clients 126 may transmit the tune data directly to the viewing behavior analysis system 100. In some embodiments, the tune data is continuously transmitted by the client 126 to the intended recipient. For example, the client may continuously report tune data in cases where the client has an available and robust network connection, such as when a client is on an IPTV network. In such circumstances, the client need not cache (i.e., store) data reflecting the tracked viewing behavior on the client device. In some embodiments, the tune data is periodically transmitted by the client 126 to the intended recipient. For example, the client may send tune data at predetermined intervals to the intended recipient. For example, the client may transfer the cached data to the system 100 or intended recipient every 6 hours, every time the associated STB is powered "on," every evening at 3 am, etc. Between transmissions, the client caches the tune data reflecting the tracked viewing behavior. When the client caches the tune data, the client employs local storage such as random access memory, a mass storage device (such as the mass storage device used by DVRs), flash drive storage, or other storage devices known in the art.

In some embodiments, a client may only transmit the data reflecting the tracked viewing behavior to the intended recipient when the intended recipient requests the client to deliver the data (i.e., a "pull" transaction). In some embodiments, the client can decide when to send the data reflecting the tracked viewing behavior to the intended recipient (i.e., a "push" transaction). For example, the client may transmit the tune data any time the client has new data available that has not yet been transmitted. In another example, the client may cache the tracked tune data in a buffer, and transmit the data when the cache buffer is becoming full to minimize the number of times the client must transmit data.

In some embodiments, the client may transmit all cached tune data at a specific and reoccurring time, such as every day at 2:00 AM, every Monday at midnight, once per month on the 26th day of the month, or once per year on every June 26th, and so on. In other embodiments, a predetermined event may trigger the transmission of tune data. For example, when the client device is powered on or off, the device's booting or shutdown procedure can trigger the transmission.

The viewing behavior analysis system 100 receives tune data from content providers 124, from third-party aggregators of tune data (not shown), and/or directly from clients 126. The tune data can be received over networks 110, such as public or private networks, and wired or wireless networks, including the Internet. Alternatively, on a periodic basis, the tune data may be provided to the system 100 by a content provider or third-party aggregator on a computer readable media such as tape drive, DVD, CD-ROM, flash drive, mechanical or solid state hard drive, etc. The system 100 stores the received tune data in a viewer database 108.

The system 100 includes a non-transitory computer readable medium 102 on which computer readable instructions are encoded for performing an analysis of the tune data. The computer readable medium is coupled to a processor 104, which executes the stored instructions in order to implement the functionality disclosed herein. In particular, the system 100 includes instructions specifying an analysis module 106 and a reporting module 107. The analysis module 106 analyzes the tune data to identify ad pods within viewership data. The analysis module uses the identified ad pods to improve the accuracy of various viewership calculations. The analysis module stores the data identifying the ad pods in ad pod database 109. The report module 107 generates reports of the analysis and provides the report to advertisers, agencies, media sellers, or other parties that are interested in measuring the effectiveness or other aspects or metrics of advertisements. The functionality of each module will be further described with respect to FIGS. 2-5.

One skilled in the art will understand that aspects and implementations of the system have been described in the general context of computer-executable instructions that are executed on a server computer. It will be appreciated that the disclosed technology can be practiced with other computer system configurations, including desktops, laptops, multi-processor systems, microprocessor-based systems, mini-computers, mainframe computers, or the like. The disclosed technology can be embodied in a special purpose computer or data processor that is specifically programmed, configured, or constructed to perform one or more of the computer-executable instructions explained in detail below.

The terms "computer" and "computing device," as used generally herein, refer to devices that have any data processor and non-transitory memory containing instructions that are executed by the processor. Data processors include programmable general-purpose or special-purpose microprocessors, programmable controllers, application-specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as magnetic or optical-based disks, flash memory devices, or any other type of non-volatile storage medium or non-transitory medium for data. Software may include one or more program modules, which include routines, programs, objects, components, data structures, and so on that perform particular tasks or implement particular abstract data types.

The disclosed technology can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the technology described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the system may reside on a server computer, while corresponding portions reside on a client computer in communication with the server computer.

Figure 2:
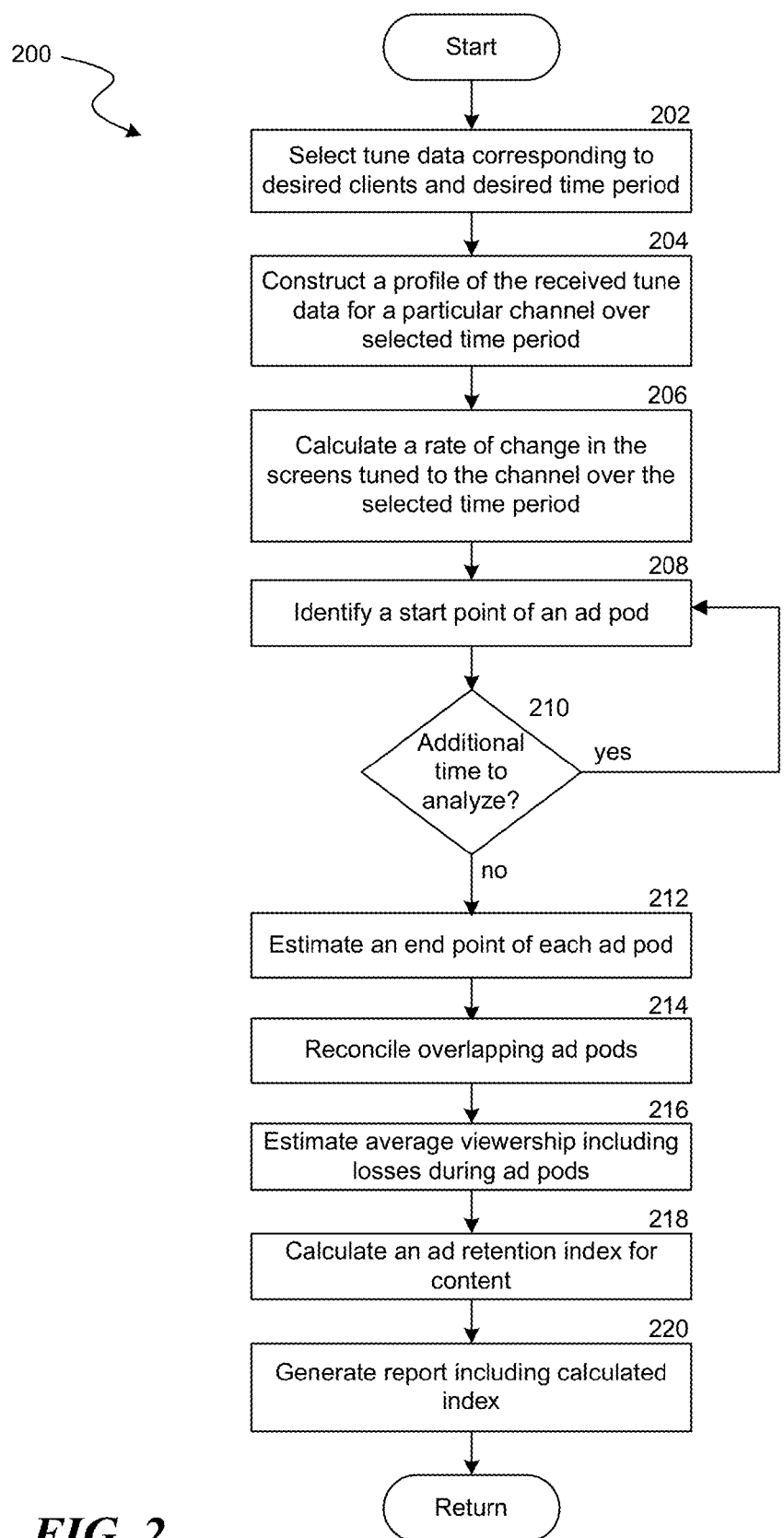
FIG. 2 is a flow diagram of a process performed by the viewing behavior analysis system to perform improved tracking of viewer behavior by detecting ad pods.

FIG. 2 is a flowchart of a process 200 of analyzing viewer behavior that is implemented by the system 100 in order to identify ad pods and assess the effect of ad pods on viewing behavior. An "ad pod" refers to one or more advertisements, such as a singular advertisement or a group of advertisements that is presented during content broadcast by a content provider. An ad pod can include visual and/or audio content, and may include national or local insertions.

The system aggregates the viewing behavior across multiple clients to determine the total number of end users likely watching particular content, such as content broadcast on a particular channel at a particular day and time. The analysis may include end users which viewed the content at the time of broadcast as well as end users who viewed the content on a delayed basis using, for example, a DVR or other delayed streaming functionality. At a block 202, the system 100 selects client tune data corresponding to desired clients and a desired time period on which to perform an analysis. As described with respect to FIG. 1, the system receives tune data from clients in multiple content-delivery channels. To analyze the tune data, a system operator therefore initially selects a desired set of clients on which the analysis will be performed. The analysis may be performed on all clients, clients associated with certain or all distribution channels, clients associated with certain or all content providers, clients associated with different playback devices, clients associated with certain or all viewer characteristics such as demographics or behavioral tendencies, etc. In addition, the system operator also selects a desired period of time over which to analyze the tune data. In some embodiments, the system 100 analyzes tune data from a short period immediately surrounding the presentation of content. For example, the system may immediately collect and analyze tune data within a short period following the end of the presented content. In some embodiments, the system 100 analyzes tune data over a longer time frame. For example, the system can analyze tune data surrounding the time that a television program was initially broadcast through a broadband cable, as well as additional tune data in the subsequent week representing times when the same television program was replayed through a DVR 118 or a digital media receiver (DMR) 128. The tune data can be analyzed for a selected time frame, such as a week, a month, etc.

Figure 3A:
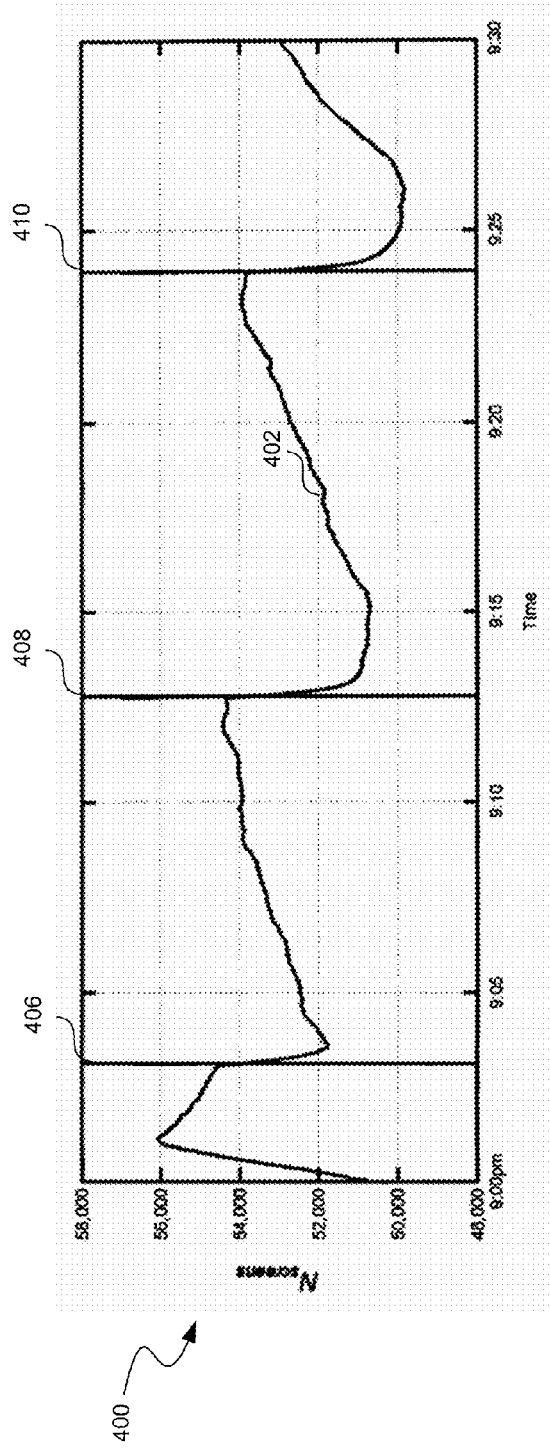
FIG. 3A is a representative graph of the aggregate viewership of a single channel of content.

At block 204, the system operator selects a specific distribution channel and time frame, or a specific program or content (the specified program or content having a corresponding time frame), on which to perform the viewership analysis. The system then constructs a viewership profile for the selected content and selected time period from the tune data collected from each client. FIG. 3A is a representative graph 400 of a viewership profile 402. The profile 402 represents an aggregate number of viewers or screens of specified content over a selected time period. The y-axis of the graph represents the number of viewers or screens that are displaying the particular channel. In the depicted example, the number of viewers or screens is shown between 48,000 and 58,000. The x-axis of the graph represents the elapsed time, starting in the depicted example at 9:00 pm and extending until 9:30 pm. The plotted viewership profile line on the graph represents the number of viewers or screens at each particular time.

The aggregate number of viewers or screens that is used by the system, such as the aggregate viewers displayed in FIG. 3A, may be an actual number or an estimated number of total viewers or screens. The system may employ a variety of techniques to estimate the number of total viewers of particular content or screens displaying particular content. In some embodiments, the system may extrapolate from a specific number of clients for which information is available in order to infer the likely behavior of a larger audience. For example, if a cable television network contains 1,000,000 STBs, but only 30,000 of those STBs contain clients capable of tracking and sending tune data to the system, the system may extrapolate from the limited number of STBs from which data is received. For example, if an audience of 634 members were watching particular content on those 30,000 STBs, the system may project that 21,133 members ((1,000,000/30,000)×634) of the larger audience were likely watching the particular content on their televisions. To arrive at the more accurate estimate of the audience, the system merely linearly scales the known viewers in a manner proportional to the overall population of the content distribution network.

In some embodiments, to improve the calculation of the aggregate number of viewers or screens, more weight may be assigned by the system 100 to data received from certain clients over others. For example, a client tracking viewing behavior of a television in a sports bar (likely watched by multiple viewers) may be given more weight than a client tracking viewing behavior on the display of a mobile phone (likely watched by a single viewer). In other examples, demographic information about the client end users may be employed to weight the analysis and determine a number of likely viewers watching each screen. Techniques that may be employed to determine the aggregate number of viewers or screens is described further in U.S. patent application Ser. No. 13/081,437, filed Apr. 6, 2011, entitled "METHOD AND SYSTEM FOR DETECTING NON-POWERED VIDEO PLAYBACK DEVICES," the content of which is hereby incorporated by reference in its entirety. To take into account a greater reliability of certain data over others, the system 100 may multiply viewership numbers from one set of clients by a factor greater than one (e.g., multiplying by 1.05) while multiplying viewership numbers from another set of clients by a factor less than one (e.g., multiplying by 0.95).

Using the data reflecting aggregate viewing behavior, the system 100 determines or estimates when advertisements are displayed during a piece of viewed content and calculates the number of viewers or screens that are retained during those advertisements. Sharp drops in the number of viewers around a particular time on a particular channel can indicate that the programming has been interrupted with an advertisement. For example, FIG. 3A illustrates sharp drops in the number of screens at three times during the represented timeframe—around 9:03 pm, around 9:13 pm, and around 9:24 pm. The profile 402 also contains more gradual declines, such as between 9:01 and 9:03 pm. The sharper drops noted by vertical lines 406, 408, 410, can signify an ad pod, whereas the more gradual declines can signify a loss in viewer interest.

Returning to FIG. 2, at block 206 the system calculates a rate of change for the viewership profile 402. The system 100 analyzes the rate of change of each drop in the profile in order to determine whether each drop is a result of advertisements or a result of a natural decline caused by viewers becoming uninterested in the broadcast content. If the rate of change of the drop (i.e., the slope of the viewership line on the graph) exceeds a predetermined threshold, the system interprets the drop to be caused by an ad pod. Calculating a derivative of the viewership profile makes it easier for the system to identify the most significant valleys, or drops, occurring during the selected time period.

Figure 3B:
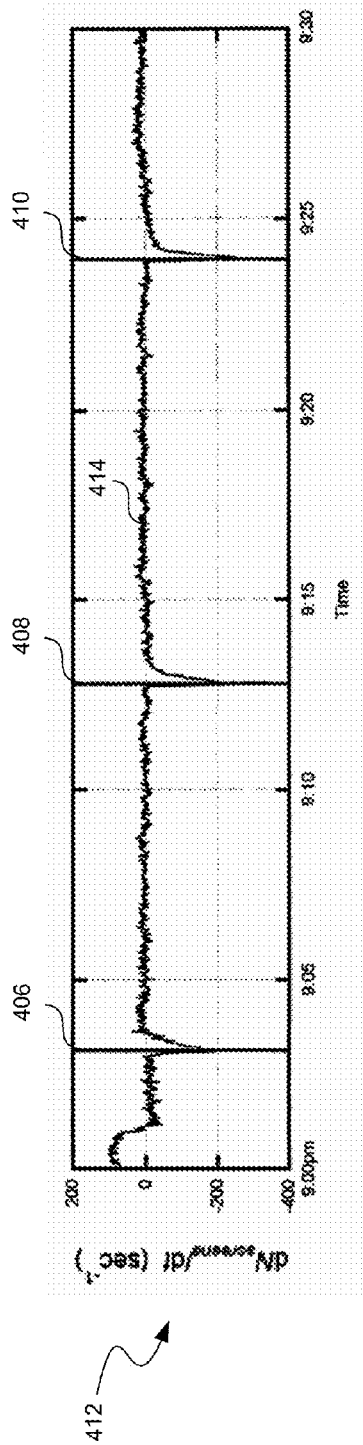
FIG. 3B is a representative graph of the rate of change of the channel in FIG. 3A that is used by the system to predict the occurrence of ad pods in the content.

FIG. 3B is a representative graph 412 illustrating a rate of change in the number of screens, or viewers, of the viewership profile 402. The system calculates a derivative of the viewership profile 402 and plots the derivative as a rate of change profile 414 on the graph. The y-axis of the graph represents a rate of change in a number of screens that are displaying on the particular channel. In the depicted example, the rate of change varies from approximately +100 screens/second to approximately −100 screens/second. The x-axis of the graph represents elapsed time, starting in the depicted example at 9:00 pm and extending until 9:30 pm. The three sharp drops observed in FIG. 3B correspond to the maximum negative measured rate of change of screens at those corresponding times. The change in the number of screens is calculated by the system from the number of screens data, for example by subtracting the number of viewers at a given point of time from the number of screens at a preceding point in time. For example, the system subtracts the number of screens at time=9:25 PM (e.g., 50,000) from the number of screens at time=9:24 PM (e.g., 53,800). The system then calculates the rate of change in the number of screens for the corresponding unit of elapsed time as follows: (50,000–53,800)/1 minute=–3,800 screens/minute or –63 screens per second. The calculated loss of the number of screens between the time period of 9:24 PM and 9:25 PM for the depicted data set is therefore an average of 63 screens lost (or –63 screens gained) per second.

The aforementioned calculation may be performed by the system 100 for any time increment in the specified time range. For example, the rate of change of the number of screens displayed can be determined for each minute between 9:00 PM and 9:30 PM. A variety of time increments can be employed for gathering data or for the analysis, e.g., 1 second, 30 seconds, 1 minute, and so on. However, it is preferable for the utilized time increment to be sufficiently small in order to allow multiple samples to fall within the period during which advertisements are being displayed, and to allow adjacent samples to fall within a period during which normal (i.e., non-advertisement) program content is being viewed. It will be understood that references herein to "screens" is equally applied to other units of viewer measurement, such as viewers, set-top boxes, computers, mobile devices, and so forth.

Returning to FIG. 2, at blocks 208-214 the system 100 performs an analysis to identify the number of ad pods within the selected time period and to estimate the start and end of each ad pod. Various methodologies may be used by the system to identify the start of ad pods. In one methodology, at block 208 the system 100 identifies the start of an ad pod by identifying when the rate of change of the number of screens exceeds a threshold rate. For example, the system may estimate that the start of an ad pod is indicated when the rate of change of screens on the rate of change profile 414 shows a decline in excess of 50 screens per minute. The threshold rate can be calculated for the content being analyzed based on a percentage of the tune data and the number of screens, or viewers, at the start of the selected time period. The threshold can be calculated by an algorithm or by a user in order to give the most sensible results based on the anticipated number of ad pods for content of a given length. In some embodiments, the threshold is selected by calculating a mean rate from a ranked order of all potential ad pod rates.

At a decision block 210, the system determines if there is additional time remaining to be analyzed in the selected time period. The system 100 starts at the beginning of the selected time period and processes through to the end of the time period to identify the start point of all ad pods in the time period. If additional time remains to be analyzed, processing returns to block 208. Otherwise, processing continues to block 212.

In another methodology to identify the start of ad pods, the system 100 may compare and rank all spikes in rates of change during the selected time period, and choose the top-ranked rates of change to represent the start of that many distinct ad pods. Because numerous drops typically occur during a selected time period, the system may filter to only identify the most significant drops. The system may choose a number of top-ranked rates of change that is equal to an anticipated number of ad pods or a user-specified number of ad pods. For example, the system can be configured to identify the three (3) most significant drops over a half-hour period to be ad pods. The anticipated number of ad pods may vary based on the length of time or type of content being analyzed. That is, the negative "spikes" in the derivative graph may be ranked in order of their magnitude, and the N most-negative spikes (sufficiently separated by normal viewing) can be selected as the start of N ad pods. N may be chosen to be a known or estimated "typical" number of ad pods for the duration of the content. For example, it may be known that for a half-hour program, the particular network or content provider always shows three sets of ads, in which case N=3 and the three most-negative periods of the time derivative of the viewership metric are then identified as the start of the ad pods.

After identification of ad pod starts, at block 212 the system 100 estimates the end of each identified ad pod. In one methodology to estimate an end of an ad pod, the system may use a historical average length of an ad pod in order to estimate the end. For example, since commercial breaks on broadcast television are typically two minutes in length, the system may use a two minute period as the default period to calculate the end of the ad pod. The historical average length that is used may vary depending on type of content (e.g., sports event, news, sitcom, serial), time of day (e.g., prime time, early morning), or other factor.

In another methodology to identify the end of ad pods, the system 100 estimates the end of each ad pod by assessing when the rate of change of the number of screens falls below a second threshold rate. When the rate of change of the number of viewers or screens rebounds sufficiently in the positive direction, it may indicate that the advertisements have been completed and the content programming is resuming. An end of an ad pod may be indicated when the rate of screen loss is declining or the rate of screen loss shows an increase in screens. For example, using the previous example the system may consider an ad pod to have ended when the rate of change falls below 25 screens per minute. The second threshold rate may be the same as or different than the threshold rate used to estimate when an ad pod has started.

It will be appreciated by one skilled in the art that the system 100 may use other derivations to calculate the start or end of an ad pod. For example, the system may determine a change in the rate of change of the viewers (i.e., a second derivative of the number of viewers with respect to time), or a change in the change of the rate of change of the viewers (i.e., a third derivative of the number of viewers with respect to time) and so on. The system may determine that a certain event is likely occurring, such as the beginning of an ad pod or a change of content, when any one of the aforementioned derivatives exceeds a predetermined value.

At block 214, the system 100 may implement various reconciliation policies to avoid arriving at erroneous ad pod estimations. For example, one rule that the system may implement is that two ad pods should not occur in an overlapping fashion. If the system 100 identifies two ad pods that appear to overlap in time such that the end of the first ad pod occurs later in time than the start of the second ad pod, the system may combine the two ad pods into a single ad pod having a length equal to the sum of the non-overlapping portions of the individual ad pods. Alternatively, the system may discard the second overlapping ad pod but keep the first ad pod, on the assumption that the second ad pod is due to an error in interpreting the tune data.

After block 214, the system 100 will have identified and recorded the number of ad pods within the time period, and estimated the start time and the end time of each ad pod. The identified ad pods within the time period are stored by the system in ad pod database 109 for subsequent use.

Once the location and length of ad pods has been estimated by the system, the system 100 is able to use the estimated ad pod times to improve the accuracy of various viewership calculations. At a block 216, the system uses the ad pod information to more accurately estimate the number of viewers viewing advertisements and more accurately estimate the number of viewers viewing the content without the advertisements. For example, if the system has determined using the aforementioned techniques that a program broadcast contains three 1 minute long ad pods beginning at 9:03 PM, 9:13 PM, and 9:24 PM, then the system can estimate the number of viewers watching those advertisements by calculating the average number of screens displaying the broadcast during the time periods when the ad pods were being played. Using the example viewership data in FIG. 3A, the system may calculate the average number of screens displaying the ad pods between 9:03-9:04 pm, 9:13-9:14 pm, and 9:24-9:25 pm as 51,000 screens. The system may also calculate the average number of viewers watching the overall broadcast 9:00 pm and 9:30 pm by averaging the number of screens displaying the broadcast during that period and arriving at 53,000 screens. The average number of viewers watching the non-advertisement content of the broadcast may then be determined either by looking at the data for the time periods of the program broadcast that exclude the ad pods (i.e., 9:00-9:03 pm, 9:04-9:13 pm, 9:14-9:24 pm, and 9:25-9:30 pm) or alternately by solving a weighted average equation, which is based on the duration of the advertisements, the duration of the overall broadcast, the average number of screens of the overall broadcast, and the average number of screens for the overall broadcast. Namely:

$$ad\_portion=(3\ minutes/30\ minutes)=10\%$$

$$combined\_screens=(ad\_portion\ \%*ad\_screens)+((100\%-ad\_portion)*non\_ad\_screens)$$

$$53,000=(10\%*51,000)+(90\%*non\_ad\_screens)$$

$$non\_ad\_screens=(53,000-5,100)/90\%$$

$$non\_ad\_screens=53,222$$

The calculated average number of viewers watching the non-advertisement content of the broadcast may provide a better estimate of the true reach of analyzed content as compared to the average number of viewers watching the overall broadcast. Conversely, advertisers may not care as much about the estimated viewership of the non-advertising content as they do about the advertising content, and may treat the estimate of the advertisement content as a better measurement of the program or content in question.

At a block 218, the system may convert the average number of viewers watching the non-advertisement content into a viewership index that allows advertisers and content producers to more quickly compare the performance of one piece of content against another. To calculate the viewership index, the system calculates a proportion of the number of screens tuned to advertisements compared to the number of screens tuned to the overall broadcast. Using the previous example, the calculated proportion is reflected as:

$$(51,000/53,000)=96.2\%$$

The system might also calculate a proportion of the number of screens watching advertisements compared to the number of screens watching non-advertised content:

$$(51,000/53,222)=95.8\%$$

The calculated proportions may be scaled to derive indices that can be quickly compared across content. For example an "ad retention index" may be determined by multiplying the proportion of screens displaying advertisements compared to the number of screens watching the full content by 100 (e.g., 96.2%*100=96.2 ad retention index). The system may perform any determination, calculation, or analysis interchangeably between numbers representing screens, viewers, proportions of screens, and proportions of viewers.

It will be appreciated that the results of the analysis performed by the system 100 may be segmented by time, geography, demographic group, and the like. For example, an analysis of viewing information associated with a first geographic region (e.g., "Washington region") may be compared with viewing information associated with a second geographic region (e.g., "Oregon region") and a third geographic region (e.g. "Northwest region, including Washington and Oregon").

Using techniques similar to the aforementioned analysis techniques, the system 100 may also calculate the number of screens for individual advertisements in an ad pod rather than for the ad pod in aggregate. For example, if the starting and ending times of a 2 minute ad pod are known, and if it is assumed that the ad pod consists of four contiguous 30 second long advertisements, then the average number of screens displaying each of the four 30 second long advertisements can be determined by the system from the "number of screens" data.

In some embodiments, the system may employ data smoothing, such as techniques based on cubic or higher-order splines, in order to identify points of negative time derivative more accurately. It will be appreciated by one skilled in the art that there are many types of data conditioning steps that may be used at various stages of the method disclosed herein. In some embodiments, the system may give more weight to certain events that cause a lost viewer as compared to other events that cause a lost viewer. For example, a viewer who was lost from the audience of a particular channel as a result of changing the channel to an adjacent channel may be given greater weight than a user lost as a result of powering off their viewing device. Furthermore, the behaviors of certain users who may be historically determined to be more likely to change the channel as a result of a commercial ("channel surfers"), may be given more weight for determining the starting or ending of an ad pod than other users not historically determined to frequently change the channel. In addition, other types of supplementary viewing data, such as time-shifted data from a DVR device, may be used to identify the start or, especially, the end of an ad pod. For example, when a viewer is fast-forwarding through the ads using a DVR, he or she can see when the ads end and use the end of the ads as a signal to resume normal-speed playback. As a result information from a DVR on when users typically resume normal-speed playback may be used to more accurately estimate the end of ad pods.

Figure 4:
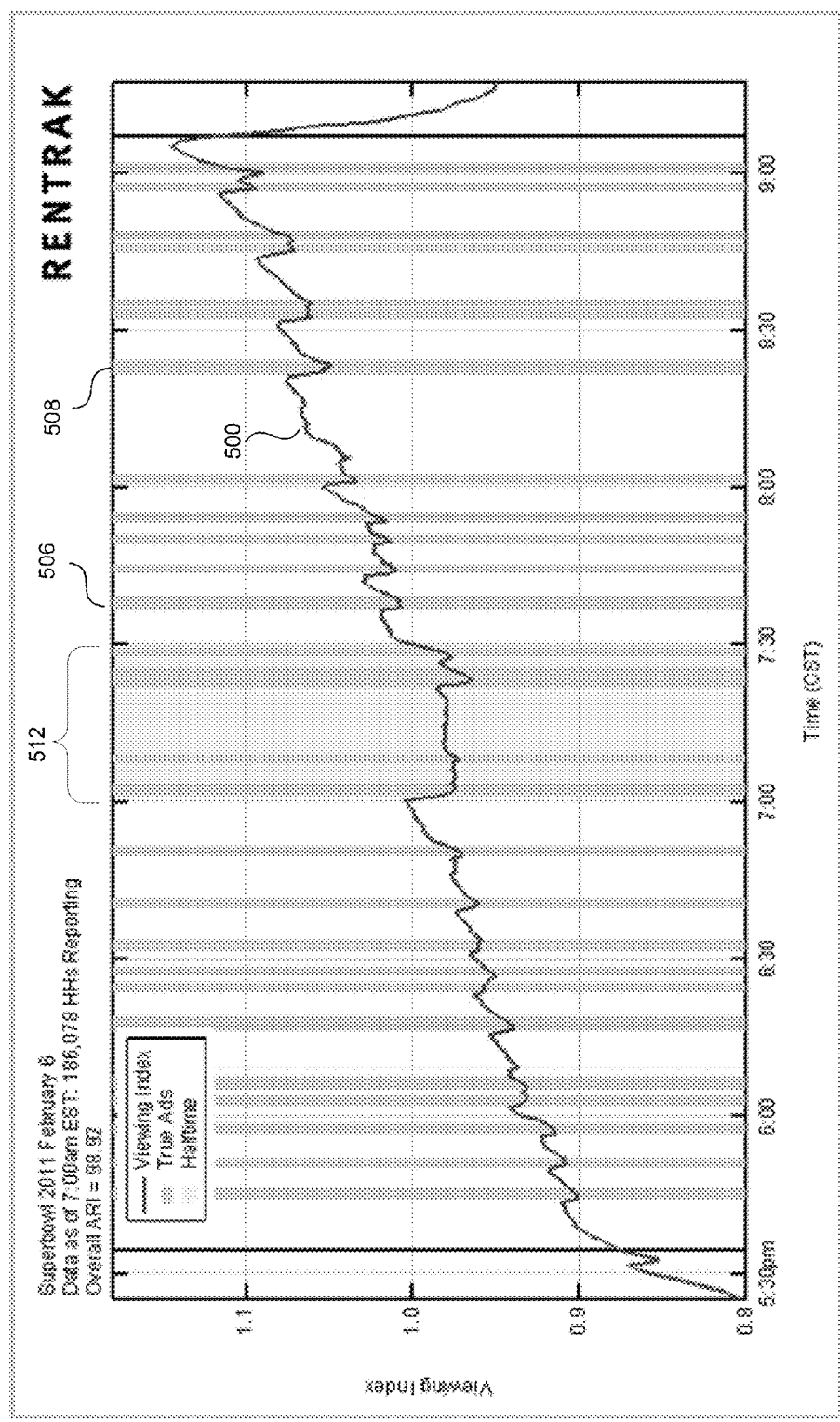
FIG. 4 is an exemplary graph of ad pods detected for a program of live broadcast content over the presentation period of the program.

Referring now to FIG. 4, a graphical representation of program viewership over a period of approximately five hours is shown. The graph represents analyzed tune data for a live content broadcast on a single channel over the graphed time frame. In FIG. 4, the live content is the Super Bowl, a popular sporting event having significant viewership and semi-scheduled advertisements.

In FIG. 4, the y-axis represents the viewing index, e.g., the ad retention index, for the live content being analyzed. As previously mentioned, the ad retention index can be calculated from the percentage of viewers tuned to a particular channel both during and not during the advertisement portions over a predetermined time frame. The x-axis represents the predetermined time frame over which the tune data for a particular channel has been collected. The measured viewing index, or ad-retention index, for the live content over the five hour timeframe of the broadcast content is represented by line 500. The line 500 includes several drops and has a gradual increase over the course of the broadcast. This corresponds to a traditional pattern in live sporting events where more viewers "tune-in" to the end of the game to determine who wins. Various events are readily discernible from the data. For example, the relatively flat portion of the line 500 in section 512 is indicative of half-time, where there is generally little change in viewers due to an extended break from game that allows viewers to do other activities.

Each vertical line, such as 506 and 508, denotes an ad-pod identified by the system 100. Each ad-pod can vary in length and can vary from the originally scheduled time, due to changes in the live content being broadcast. However, as shown on the graph in FIG. 4, there is a strong correlation between the decline in viewership, or drops, and the detected start of ad pods The system 100 described herein is particularly useful for embodiments such as those described with reference to FIG. 4. With typical content broadcasts, advertisements are presented by a content provider on a regular and predictable basis. However, during live broadcasts, scheduled programming can vary. For example, during the Super Bowl a portion of the game may be extended to provide coverage of a touchdown. Accordingly, the scheduled advertisements may be delayed. The viewer behavior system 100 can accurately detect the ad pod start and ending and therefore provide more accurate viewership assessments during the broadcast content. Oftentimes, the aforementioned type of viewership information is more valuable to advertisers to enable them to better understand the reach of their advertisements and better direct their advertising budgets to certain content over others.

Figure 5:
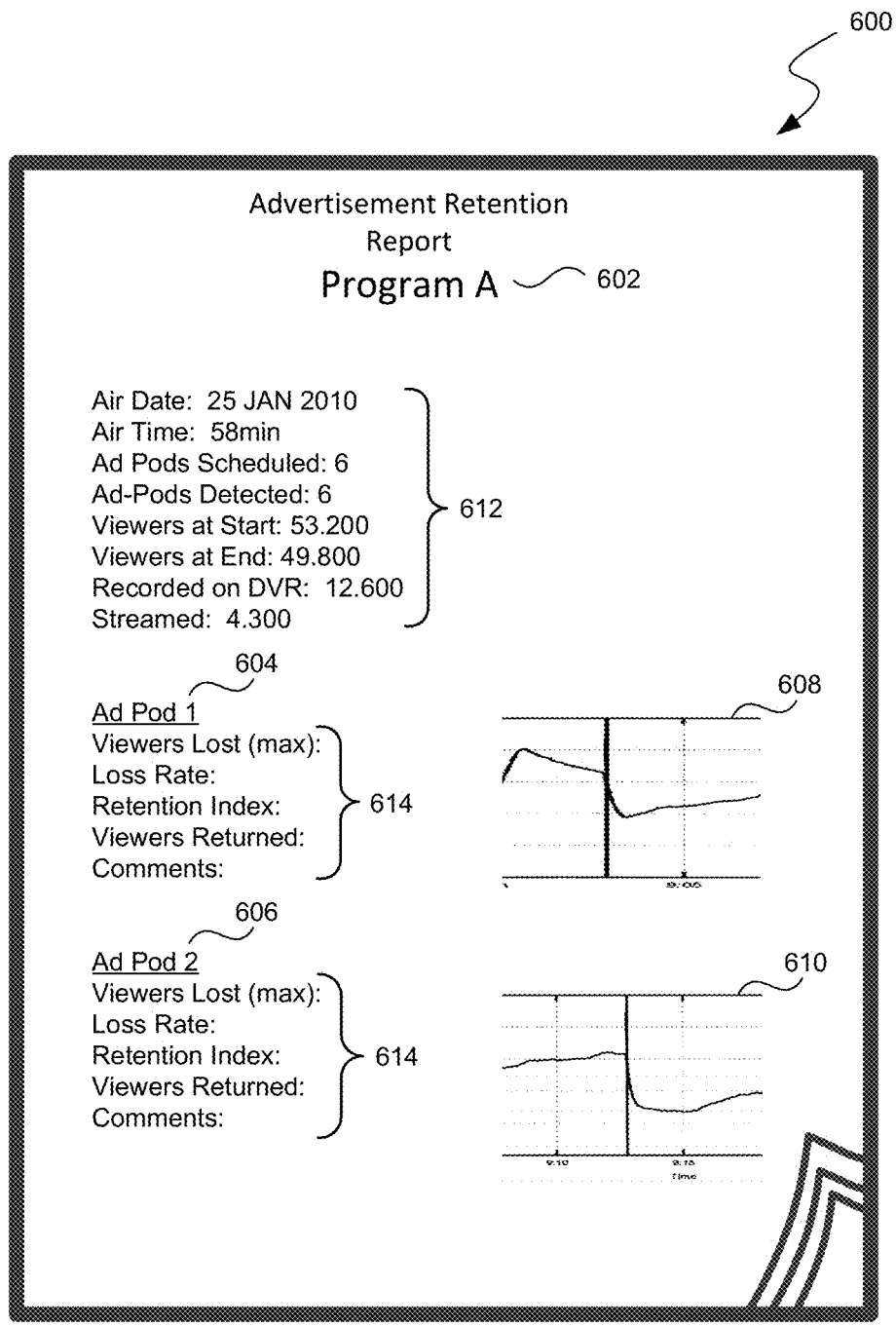
FIG. 5 is an exemplary report generated by the viewing behavior analysis system.

FIG. 5 depicts a representative report 600 that is generated by the viewing behavior analysis system 100. The report can be generated for a selected time frame, such as four (4) hours of content on a particular channel. In other embodiments, the report can be generated by the system on a per program, or specific content, basis. By virtue of the system 100 including data from DVR playback devices, and other devices capable of streaming the content at times other than the allotted time frame at which the specified content is broadcast, a report generated on a per program basis is typically generated at a certain time after the original content broadcast. Introducing such a delay to the report generation allows the DVR and subsequent playback tune data to be included in the analysis. In other embodiments, the report can be generated on a screen-type basis. For example, a report can be generated based on standard STB tune data, or based on streamed content, e.g., through a DVR, DMR or Smartphone.

The report provides an interested parties, such as a content provider 124, advertiser, content producer, etc., with comprehensive data regarding viewer behavior during a particular program. For example, as shown in FIG. 5, the report 600 may include summarized information regarding the viewer tune data and the program. A title 602 of the report identifies the content being analyzed as "Program A." A summary region 612 of the report provides various data characterizing the broadcast and subsequent viewing of the program. For example, Program A was broadcast over a fifty-eight (58) minute time frame on Jan. 25, 2010. The content provider that broadcast the program had six (6) ad pods scheduled during the programming and six (6) ad pods were detected by the system 100. The summary region 612 can also provide the types of platforms on which the tune data was monitored, such as DVR and streaming, along with the number of viewers, or screens, determined at the beginning and end of the broadcast.

As shown in FIG. 5, each ad pod 604, 606 can be separately displayed in the report 600 and summary information 614 provided about each add pod. Various measurements, such max viewers lost, loss rate, retention index, viewers returned, and comments, can be provided by the system in the summary information 614. The system may also include graphical representations 608, 610 in the report 600 for each of the ad pods detected during the monitored program. In some embodiments, the report just includes the ad retention index that is calculated for each ad pod during a program being monitored. In other embodiments, various additional measurements can be determined for each individual ad pod, such as loss rate for each increment over the duration of the ad pod. The aforementioned information can be useful, for example, for advertisers to assess the performance of a specific advertisement during a specific ad pod.

The report may also provide an indication (e.g., through highlighting or other visual notification) where content or ads had drops that occurred more or less frequently. For example, the report may provide a statistic regarding a mean drop rate for the ad pods during the presentation period of specific content, or a mean loss of viewers during ad pods versus the overall mean loss of viewers for the content. The lower the overall drop rate, the less frequently viewers were lost during that presentation period. As a specific example, the report may indicate that a third ad pod in an hour (60 min) of content broadcast at 10:00 am experiences the most significant drop out of three (3) ad pods regularly scheduled during that corresponding presentation period. Accordingly, the third ad pod may be highlighted red to indicate that the most viewers/screens were lost and that advertisers may wish to avoid placing their ads in that particular ad pod. In addition, the report may indicate that out of the three (3) aforementioned ad pods, the first ad pod experiences the overall slowest rate of change, i.e., the most gradual decline in viewers, and that the rate of change increases (e.g., accelerates) the least over that ad pod. The rate of change and acceleration of an ad pod may indicate that an ad shown during that ad pod, especially during the start of that ad pod where the maximum number of viewers are still present, is much more likely to be viewed than at other times during the presentation period.

The report may also include a comparison of ad pod performance across multiple presentations of similar content. For example, the system may calculate viewing behavior associated with a sitcom program presented across multiple weeks. Using the statistics calculated each week, the system may include average statistics for ad pod presentation periods and/or content presentation periods in the report. Providing average statistics across multiple period allows a user to compare statistics for a current program with historical averages to determine whether the current presentation is better or worse than the norm.

The report can be generated by the system 100 and provided to an interested party in various formats. For example, the report can be a web page or web site, a digital image file, a PowerPoint presentation file, a document for word processing software, a portable document format ("PDF") file, a web browser readable html file, a spreadsheet, a database file, a communication format that is readable by a facsimile machine, format consumable by a printer, and so on. Various additional techniques may be employed to generate and deliver reports, as described further in U.S. patent application Ser. No. 13/096,964, filed Apr. 28, 2011, entitled "METHOD AND SYSTEM FOR PROGRAM PRESENTATION ANALYSIS," the contents of which are hereby incorporated by reference in their entireties.

In alternative embodiments, the system may be implemented for audio media. For example, the system may analyze tuning data indicating when end users are listening to audio content (such as a radio broadcast) and when they have stopped listing to audio content. In this embodiment, the aforementioned system and methods are applied to tune data reflecting a user's listening to audio. Such audio broadcasts may include satellite radio, internet radio, over the air radio broadcast, as some examples.

Those skilled in the art will appreciate that the actual implementation of the data storage area may take a variety of forms, and the phrase "database" is used herein in the generic sense to refer to any area that allows data to be stored in a structured and accessible fashion using such applications or constructs as relational databases, tables, linked lists, arrays, flat files, and so on. Those skilled in the art will further appreciate that the depicted flow charts may be altered in a variety of ways. For example, the order of the steps may be rearranged, steps may be performed in parallel, steps may be omitted, or other steps may be included.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A computer-implemented method performed at a viewing behavior analysis system in communication across a network with a plurality of content providers and a plurality of video playback devices, the method for assessing drops in viewership during one or more advertisements that are broadcast in association with content having a scheduled programming variation, the method comprising:
    receiving, at the viewing behavior analysis system, tune data across the network from one or more clients, each client associated with a video playback device of the plurality of playback devices and capturing events representing viewing behavior of content on the associated video playback device;
    receiving, at the viewing behavior analysis system, a selection of content from a user on which to perform a viewing analysis, the selection including the variation from scheduled programming;
    analyzing, at the viewing behavior analysis system, tune data associated with the selected content in order to construct a profile of viewership across a number of clients, the viewership profile reflecting an actual or extrapolated number of viewers that viewed the content during a corresponding presentation period, the presentation period including the variation from scheduled programming;
    analyzing, at the viewing behavior analysis system, the viewership profile to identify one or more drops in viewers during the corresponding presentation period that exceeds a threshold rate, the identified one or more drops indicative of an advertisement or advertisements presented in conjunction with the content;
    for each of the identified drops that exceeds the threshold rate, estimating, at the viewing behavior analysis system, a start point and an end point for the identified drop;
    calculating, at the viewing behavior analysis system, a viewership loss rate for each drop, wherein the loss rate is calculated over a time interval determined by the estimated start point and end point and wherein the loss rate reflects a drop in viewership as a result of the advertisements; and
    providing, from the viewing behavior analysis system, a report of the viewership loss rate for each drop, the report indicating when the advertisements were offset in response to the variation from scheduled programming in a time series graphical representation.

2. The method of claim 1, wherein the tune data includes power-up or power-down events, channel changing or content switching events, or playback events.

3. The method of claim 1, wherein the clients include a set-top box client, a digital video recorder client, a viewer measurement device client, and a computing device client.

4. The method of claim 1, wherein the content is selected by the user by specifying a time period during which content was presented.

5. The method of claim 1, wherein the content is selected by the user specifying a program or other discrete piece of content.

6. The method of claim 1, wherein the extrapolated number of viewers is determined by taking an actual number of viewers and estimating a number of viewers for which tune data is missing from clients.

7. The method of claim 1, further comprising adjusting the actual or extrapolated number of viewers based on a confidence in the tune data received from certain clients.

8. The method of claim 7, wherein the adjustment is made by applying a weighting factor to tune data from one or more clients.

9. The method of claim 1, wherein the threshold rate is based on a percentage of the tune data and the number of viewers at the start of the presentation period.

10. The method of claim 1, further comprising:
    analyzing the identified drops to determine if a start point and an end point of different adjacent drops overlap in time; and
    applying a reconciliation process for those identified adjacent drops that have overlapping start points and end points.

11. The method of claim 1, further comprising using the calculated viewership loss rate for each drop to calculate an ad retention index for the corresponding content.

12. The method of claim 1, further comprising:
    receiving a desired geographic or demographic segmentation; and
    filtering the analyzed tune data associated with the selected content to only use tune data associated with the desired geographic or demographic segmentation.

13. A non-transitory computer readable medium encoded with instructions that, when executed by a processor, perform a method for assessing drops in viewership during one or more advertisements that are broadcast in association with content having a scheduled programming variation, the method comprising:
    receiving, at a viewing behavior analysis system, tune data across a network from one or more clients, each client associated with a video playback device of a plurality of playback devices and capturing events representing viewing behavior of content on the associated video playback device;
    receiving, at the viewing behavior analysis system, a selection of content from a user on which to perform a viewing analysis, the selection including a variation from scheduled programming;

analyzing, at the viewing behavior analysis system, tune data associated with the selected content in order to construct a profile of viewership across a number of clients, the viewership profile reflecting an actual or extrapolated number of viewers that viewed the content during a corresponding presentation period, the presentation period including the variation from scheduled programming;

analyzing, at the viewing behavior analysis system, the viewership profile to identify one or more drops in viewers during the corresponding presentation period that exceeds a threshold rate, the identified one or more drops indicative of an advertisement or advertisements presented in conjunction with the content;

for each of the identified drops that exceeds the threshold rate, estimating, at the viewing behavior analysis system, a start point and an end point for the identified drop;

calculating, at the viewing behavior analysis system, a viewership loss rate for each drop, wherein the loss rate is calculated over a time interval determined by the estimated start point and end point and wherein the loss rate reflects a drop in viewership as a result of the advertisements; and providing, from the viewing behavior analysis system, a report of the viewership loss rate for each drop, the report indicating when the advertisements were offset in response to the variation from scheduled programming in a time series graphical representation.

14. The non-transitory computer readable medium of claim 13, wherein the tune data includes power-up or power-down events, channel changing or content switching events, or playback events.

15. The non-transitory computer readable medium of claim 13, wherein the extrapolated number of viewers is determined by taking an actual number of viewers and estimating a number of viewers for which tune data is missing from clients.

16. The non-transitory computer readable medium of claim 13, further comprising: adjusting the actual or extrapolated number of viewers based on a confidence in the tune data received from certain clients.

17. The non-transitory computer readable medium of claim 15, wherein the adjustment is made by applying a weighting factor to tune data from one or more clients.

18. The non-transitory computer readable medium of claim 13, wherein the threshold rate is based on a percentage of the tune data and the number of viewers at the start of the presentation period.

19. The non-transitory computer readable medium of claim 13, further comprising:
   receiving a desired geographic or demographic segmentation; and
   filtering the analyzed tune data associated with the selected content to only use tune data associated with the desired geographic or demographic segmentation.

20. The non-transitory computer readable medium of claim 13, further comprising: using the calculated viewership loss rate for each drop to calculate an ad retention index for the corresponding content.

* * * * *